United States Patent
Lastusaari et al.

(10) Patent No.: US 11,079,498 B2
(45) Date of Patent: Aug. 3, 2021

(54) DETERMINING THE AMOUNT OF A PREDETERMINED TYPE OF RADIATION IRRADIATED ON A SENSOR MATERIAL

(71) Applicant: Turun yliopisto, Turun yliopisto (FI)

(72) Inventors: Mika Lastusaari, Turku (FI); Isabella Norrbo, Turku (FI)

(73) Assignee: Turun yliopisto, Turun yliopisto (FI)

( * ) Notice: Subject to any disclaimer, the term of this patent is extended or adjusted under 35 U.S.C. 154(b) by 0 days.

(21) Appl. No.: 16/761,952

(22) PCT Filed: Oct. 17, 2018

(86) PCT No.: PCT/FI2018/050761
§ 371 (c)(1),
(2) Date: May 6, 2020

(87) PCT Pub. No.: WO2019/092308
PCT Pub. Date: May 16, 2019

(65) Prior Publication Data
US 2020/0386899 A1 Dec. 10, 2020

(30) Foreign Application Priority Data
Nov. 7, 2017 (FI) ..................................... 20175992

(51) Int. Cl.
*G01T 1/115* (2006.01)
*G01K 11/12* (2021.01)

(52) U.S. Cl.
CPC .............. *G01T 1/115* (2013.01); *G01K 11/12* (2013.01)

(58) Field of Classification Search
CPC ................................ G01T 1/115; G01K 11/12
See application file for complete search history.

(56) References Cited

U.S. PATENT DOCUMENTS

| 4,490,286 A | * | 12/1984 | Volynets | ................ | G03C 1/725 252/301.4 F |
| 5,656,815 A | * | 8/1997 | Justus | ........................ | G01T 1/11 250/337 |

(Continued)

FOREIGN PATENT DOCUMENTS

| CN | 101124296 A | 2/2008 |
| CN | 103396790 A | 11/2013 |

(Continued)

OTHER PUBLICATIONS

International Search Report for corresponding International Patent Application No. PCT/FI2018/050761 dated Jan. 11, 2019, 4 pages.

(Continued)

*Primary Examiner* — Yara B Green
(74) *Attorney, Agent, or Firm* — Merchant & Gould P.C.

(57) ABSTRACT

The application relates to determining the amount of a predetermined type of radiation irradiated on a sensor material by: a) providing a sensor material; b) exposing the sensor material to the predetermined type of radiation for retaining the predetermined type of radiation in the sensor material for a predetermined period of time; c) subjecting the sensor material, which has been exposed to the predetermined type of radiation, to heat treatment and/or to optical stimulation; and d) determining the amount of visible light emitted by the sensor material as a result of being subjected to the heat treatment and/or to the optical stimulation; wherein the sensor material is represented by the following formula (I).

25 Claims, 5 Drawing Sheets

(56) References Cited

U.S. PATENT DOCUMENTS

| | | |
|---|---|---|
| 2010/0176343 A1 | 7/2010 | Chen et al. |
| 2012/0211672 A1 | 8/2012 | Yoder |
| 2014/0264045 A1 | 9/2014 | Marcheschi et al. |

FOREIGN PATENT DOCUMENTS

| | | |
|---|---|---|
| CN | 104937073 A | 9/2015 |
| DE | 198 33 176 A1 | 2/2000 |
| EP | 1 681 335 A2 | 7/2006 |
| JP | S49-89689 A | 8/1974 |
| JP | 2013-134158 A | 7/2013 |
| JP | 2016-099177 A | 5/2016 |

OTHER PUBLICATIONS

Written Opinion of the International Searching Authority for corresponding International Patent Application No. PCT/FI2018/050761 dated Jan. 11, 2019, 5 pages.

Finnish Search Report for corresponding Finnish Patent Application No. 20175992 dated Jun. 7, 2018, 2 pages.

Armstrong, J. et al., "Structural observatioin of photochromism", Chem. Commun., 1094-1096 (2006).

Norrbo, I. et al., "Persistent Luminescence of Tenebrescent Na8AI6Si6O24 (CI,S) 2: Multifunctional Optical Markers", Inorganic Chemistry, 54(16): 7717-7724 (2015).

Norrbo, I. et al., "Mechanisms of Tenebrescence and Persistent Luminescence in Synthetic hackmanite Na8AI6Si6O24(CI,S)2", ACS Applied Materials & Interfaces, 8: 11592-11602 (2016).

Norrbo, I. et al. "Lanthanide and Heavy Metal Free Long White Persistent Luminescence from Ti Doped Li-Hackmanite: A Versitile, Low-Cost Material", Advanced Functional Materials, 27: 199 (2017).

Zahoransky, T. et al., "Luminescence and tenebrescence of natural sodalities: a chemical and structural study", Phys. Chem. Minerals, 43: 459-480 (2016).

\* cited by examiner

DETERMINING THE AMOUNT OF A PREDETERMINED TYPE OF RADIATION IRRADIATED ON A SENSOR MATERIAL

This application is a National Stage Application of PCT/FI2018/050761, filed 17 Oct. 2018, which claims benefit of Serial No. 20175992, filed 7 Nov. 2017 in Finland and which applications are incorporated herein by reference. To the extent appropriate, a claim of priority is made to each of the above disclosed applications.

FIELD OF THE INVENTION

The present application relates to a method for determining the amount of a predetermined type of radiation irradiated on a sensor material. The present application further relates to a detecting device and to a system for determining the amount of a predetermined type of radiation irradiated on a sensor material. The present application further relates to different uses.

BACKGROUND

Elevated levels of ultraviolet (UV) irradiation, whether caused by sunlight or tanning ultraviolet devices, has the adverse effect of increasing the probability of skin cancer, other diseases of the skin as well as skin aging. Knowing when to seek for cover from ultraviolet radiation or when to apply or reapply sunscreen lotion is thus of importance. The same may also apply to other types of radiation, such as X-radiation or alpha radiation, beta radiation, or gamma radiation, used in different applications in e.g. medical appliances or diagnostics. Knowing the amount of radiation that an object has been exposed to is thus of high relevance in different applications. The inventors have recognized the need for a manner to indicate or determine the amount of a predetermined type of radiation that a subject has been exposed to.

Purpose

The purpose of the application is to provide a new method for determining the amount of a predetermined type of radiation irradiated on a sensor material. Further, the purpose of the application is to provide a new detecting device for determining the amount of a predetermined type of radiation irradiated on a sensor material. Further, the purpose of the application is to provide a new system for determining the amount of a predetermined type of radiation irradiated on a sensor material. Further, the purpose of the application is to provide different uses.

SUMMARY

The method according to the present application is characterized by what is presented in claim 1.

The detecting device according to the present application is characterized by what is presented in claim 18.

The system according to the present application is characterized by what is presented in claim 22.

The uses according to the present application are characterized by what is presented in claim 25, claim 26, and claim 27.

BRIEF DESCRIPTION OF THE DRAWINGS

The accompanying drawings, which are included to provide a further understanding of the detecting device, the system, and the method and constitute a part of this specification, illustrate embodiments and together with the description help to explain the principles of the above. In the drawings.

DETAILED DESCRIPTION

The present application relates to a method for determining the amount of a predetermined type of radiation irradiated on a sensor material, wherein the method comprises:

a) providing the sensor material;

b) exposing the sensor material to the predetermined type of radiation for retaining the predetermined type of radiation in the sensor material for a predetermined period of time;

c) subjecting the sensor material, which has been exposed to the predetermined type of radiation, to heat treatment and/or to optical stimulation; and d) determining the amount of visible light emitted by the sensor material as a result of being subjected to the heat treatment and/or to the optical stimulation;

wherein the sensor material is represented by the following formula (I)

$$(M')_8(M''M''')_6O_{24}(X,X')_2:M'''' \qquad \text{formula (I)}$$

wherein

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;

X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or any combination of such cations, or wherein M'''' is absent;

with the proviso that at least one of X and X' is present.

The present application relates to a detecting device for determining the amount of a predetermined type of radiation irradiated on a sensor material, wherein the detecting device comprises:

a sensor material represented by the formula (I) as defined in this specification;

a heating unit configured to subject the sensor material, having been exposed to the predetermined type of radiation, to a heat treatment, and/or a stimulation unit configured to subject the sensor material, having been exposed to the predetermined type of radiation, to optical stimulation; and a measuring unit configured to measure the amount of visible light emitted by the sensor material as a result of being subjected to the heat treatment and/or to the optical stimulation.

The present application further relates to a system for determining the amount of a predetermined type of radiation irradiated on a sensor material, wherein the system comprises:

a radiation unit configured to expose the sensor material to the predetermined type of radiation for retaining the predetermined type of radiation in the sensor material for a predetermined period of time; and a detecting device as defined in this specification.

The present application further relates to a system for determining the amount of a predetermined type of radiation irradiated on a sensor material, wherein the system comprises:

a sensor material represented by the formula (I) as defined in this specification;

a radiation unit configured to expose the sensor material to the predetermined type of radiation for retaining the predetermined type of radiation in the sensor material for a predetermined period of time;

a heating unit configured to subject the sensor material, having been exposed to the predetermined type of radiation, to a heat treatment, and/or a stimulation unit configured to subject the sensor material, having been exposed to the predetermined type of radiation, to optical stimulation; and a measuring unit configured to measure the amount of visible light emitted by the sensor material as a result of being subjected to the heat treatment and/or to the optical stimulation.

The present application further relates to the use of a heat treatment and/or optical stimulation for determining the amount of a predetermined type of radiation irradiated on a sensor material represented by the formula (I) as defined in this specification.

The present application further relates to the use of a sensor material represented by the formula (I) as defined in this specification for determining the amount of a predetermined type of radiation that is irradiated on the sensor material, wherein the sensor material is exposed to the predetermined type of radiation for retaining the predetermined type of radiation in the sensor material for a predetermined period of time, and thereafter subjected to a heat treatment and/or to optical stimulation.

The present application further relates to the use of the sensor material represented by the formula (I) as defined in this specification in a thermoluminescent dosimeter or in an optically stimulated luminescent dosimeter.

In one embodiment, the amount of a predetermined type of radiation refers to the dose and/or intensity of the predetermined type of radiation. In one embodiment, the amount of visible light emitted by the sensor material refers to the dose and/or intensity of the visible light emitted by the sensor material.

The inventors surprisingly found out that the sensor material represented by formula (I) is able to retain radiation that is irradiated thereon. Further, the inventors surprisingly found out that the ability of the sensor material represented by formula (I) to act as a luminescent material together with its ability to retain radiation irradiated thereon enables it to be used for indicating or determining the amount of a predetermined type of radiation that is irradiated on e.g. an object in different applications where irradiation is involved. Being able to accurately determine the amount of radiation that a subject has been exposed to is beneficial in many applications, such as during light therapy. A luminescent material is a material that is able to receive and absorb light of a first wavelength range emitted by e.g. a light emitting element, and emitting the absorbed energy at one or more other wavelength ranges.

In one embodiment, the predetermined type of radiation is a predetermined type of particle radiation. In one embodiment, the particle radiation is alfa radiation, beta radiation, neutron radiation, or any combination thereof.

In one embodiment, the predetermined type of radiation is a predetermined type of electromagnetic radiation. In one embodiment, the predetermined type of radiation is electromagnetic radiation having a wavelength of above 0 nm to 590 nm, or above 0 nm to 560 nm, or above 0 nm to 500 nm, or above 0 nm to 400 nm, or above 0 nm to 300 nm, or 0.000001-590 nm, or 0.000001-560 nm, or 0.000001-500 nm, or 10-590 nm, or 10-560 nm, or 10-500 nm, or 0.000001-400 nm, or 0.000001-300 nm, or 0.000001-10 nm, or 10-400 nm, or 10-300 nm, or 0.01-10 nm. In one embodiment, the radiation unit is configured to expose the sensor material to electromagnetic radiation having a wavelength of above 0 nm to 590 nm, or above 0 nm to 560 nm, or above 0 nm to 500 nm, or above 0 nm to 400 nm, or above 0 nm to 300 nm, or 0.000001-590 nm, or 0.000001-560 nm, or 0.000001-500 nm, or 10-590 nm, or 10-560 nm, or 10-500 nm, or 0.000001-400 nm, or 0.000001-300 nm, or 0.000001-10 nm, or 10-400 nm, or 10-300 nm, or 0.01-10 nm.

In one embodiment, the predetermined type of radiation is ultraviolet radiation, X-radiation, gamma radiation, or any combination thereof. In one embodiment, the predetermined type of radiation is ultraviolet radiation. In one embodiment, the predetermined type of radiation is X-radiation. In one embodiment, the predetermined type of radiation is gamma radiation.

Ultraviolet light is electromagnetic radiation with a wavelength from 10 nm (30 PHz) to 400 nm (750 THz). The electromagnetic spectrum of ultraviolet radiation (UVR) can be subdivided into a number of ranges recommended by the ISO standard ISO-21348, including ultraviolet A (UVA), ultraviolet B (UVB), ultraviolet C (UVC). The wavelength of UVA is generally considered to be 315-400 nm, the wavelength of UVB is generally considered to be 280-320 and the wavelength of UVC is generally considered to be 100-290 nm.

In one embodiment, the ultraviolet radiation comprises ultraviolet A radiation, ultraviolet B radiation and/or ultraviolet C radiation. In one embodiment, the ultraviolet radiation consists of ultraviolet A radiation, ultraviolet B radiation and/or ultraviolet C radiation. In one embodiment, the ultraviolet radiation is ultraviolet A radiation, ultraviolet B radiation and/or ultraviolet C radiation.

X-radiation is electromagnetic radiation with a wavelength from 0.01 nm to 10 nm.

Gamma radiation is electromagnetic radiation with a wavelength from 0.000001 nm to 0.01 nm.

In one embodiment, the predetermined type of electromagnetic radiation is sunlight. In one embodiment, the predetermined type of electromagnetic radiation originates from a source of artificial radiation or from sunlight. In one embodiment, the artificial radiation is UV light, LED-light, halogen light, solar simulator light, fluorescent light, X-radiation, or any combination thereof.

In one embodiment, the sensor material is exposed to the predetermined type of radiation for 0.5-60 seconds, or 1-20 seconds. In one embodiment, the sensor material is exposed to the predetermined type of radiation for 0.5 seconds to 6 weeks. In one embodiment, the sensor material is exposed to the predetermined type of radiation for 0.5-6 weeks, or 1-4 weeks, or 2-3 weeks. The time the sensor material is allowed to be exposed to the predetermined type of radiation may depend on the application where the sensor material is used and thus on the type of radiation to which the sensor material is to be exposed to.

In one embodiment, the irradiated predetermined type of radiation is retained in the sensor material for a predetermined period of time before subjecting the sensor material to the heat treatment and/or to the optical stimulation. In one embodiment, the predetermined period of time is at least 1 minute, or at least 2 minutes, or at least 5 minutes, or at least 10 minutes, or at least 15 minutes, or at least 0.5 hour, or at least 1 hour, or at least 2 hours, or at least 5 hours, or at least 6 hours, or at least 8 hours, or at least 12 hours, or at least 18 hours, or at least 24 hours, or at least one week, or at least one month. In one embodiment, the predetermined period of time is at most 3 months, or at most one month, or at most one week, or at most 24 hours. In one embodiment, the predetermined period of time is 1 minute-3 months, or 10 minutes-one month, or 0.5 h-one week. In one embodiment, said predetermined period of time is 0.5 h-3 months.

The inventors surprisingly found out that the sensor material as described in this application has the ability to retain radiation energy, i.e. the sensor material is able to trap the radiation therein. The inventors further surprisingly found out that the retained radiation may be released from the sensor material by a heat treatment and/or by optical stimulation. The inventors surprisingly found out that it was possible to make the sensor material to emit visible light as a result of increasing the temperature thereof. I.e. increasing the temperature of the sensor material from the temperature where the sensor material is used may result in the sensor material being able to emit visible light. In one embodiment, the heat treatment comprises heating the sensor material. In one embodiment, the heat treatment comprises increasing the temperature of the sensor material. In one embodiment, the heat treatment comprises increasing the temperature of the sensor material compared to the temperature of the sensor material in step b). In one embodiment, the heat treatment comprises increasing the temperature of the sensor material by at least 10° C., or by at least 50° C., or by at least 100° C., or by at least 500° C. In one embodiment, the heat treatment comprises subjecting the sensor material to a temperature of −196° C.-600° C., or −196° C.-400° C., or 0-600° C., or 120-500° C., or 180-400° C. In one embodiment, the heating unit is configured to heat the sensor material. In one embodiment, the heating unit is configured to increase the temperature of the sensor material. In one embodiment, the heating unit is configured to increase the temperature of the sensor material compared to the temperature of the sensor material when being exposed to the predetermined type of radiation. In one embodiment, the heating unit is configured to increase the temperature of the sensor material by at least 10° C., or by at least 50° C., or by at least 100° C., or by at least 500° C. In one embodiment, the heating unit is configured to subject the sensor material to a temperature of −196° C.-600° C., or −196° C.-400° C., or 0-600° C., or 120-500° C., or 180-400° C. In one embodiment, the sensor material is subjected to the heat treatment for 0.5 seconds-10 minutes, or 1-5 seconds, or 1 second-3 minutes.

In one embodiment, the optical stimulation of the sensor material comprises subjecting the sensor material to electromagnetic radiation having a wavelength of 310-1400 nm. In one embodiment, the optical stimulation of the sensor material comprises subjecting the sensor material to ultraviolet radiation and/or to near infrared radiation. In on embodiment, the stimulation unit is configured to subject the sensor material to electromagnetic radiation having a wavelength of 310-1400 nm. In one embodiment, the optical stimulation of the sensor material is carried out by using a laser, a light emitting diode (LED), an organic light-emitting diode (OLED), an active-matrix organic light emitting diode (AMOLED), an incandescent lamp, a halogen lamp, any other optical stimulation luminescence light source, or any combination thereof. In one embodiment, the stimulation unit is a laser, a light emitting diode (LED), an organic light-emitting diode (OLED), an active-matrix organic light emitting diode (AMOLED), an incandescent lamp, a halogen lamp, any other optical stimulation luminescence light source, or any combination thereof.

In one embodiment, the amount of visible light emitted by the sensor material is determined by optical imaging, by photography, by thermally stimulated luminescence, and/or by optically stimulated luminescence. In one embodiment, the amount of visible light emitted by the sensor material is visually determined.

In one embodiment, the method comprises e) comparing the determined amount of visible light emitted by the sensor material with a reference indicating the correlation of the amount of emitted visible light with the amount of the predetermined type of radiation that the sensor material has been exposed to. In on embodiment, the detecting device comprises a reference configured to indicate the correlation of the determined amount of visible light emitted by the sensor material with the amount of the predetermined type of radiation that the sensor material has been exposed to. In on embodiment, the system comprises a reference configured to indicate the correlation of the determined amount of visible light emitted by the sensor material with the amount of the predetermined type of radiation that the sensor material has been exposed to. The reference may be e.g. a card or the like that indicates the correlation between the amount of the predetermined type of radiation and the amount of visible light emitted by the sensor material.

The inventors surprisingly found out that the amount of visible light emitted by the sensor material, represented by formula (I), is dependent upon the radiation exposure. In one embodiment, the amount of visible light emitted by the sensor material correlates to or is dependent on the amount of predetermined type of radiation that the sensor material has been exposed to. In one embodiment, the amount of visible light emitted by the sensor material is proportional to the amount of predetermined type of radiation that the sensor material has been exposed to.

In one embodiment, M' represents a monoatomic cation of an alkali metal selected from a group consisting of Na, Li, K, and Rb, or any combination of such cations. In one embodiment, M' represents a monoatomic cation of an alkali metal selected from a group consisting of Li, K, and Rb, or any combination of such cations.

In one embodiment, M' represents a monoatomic cation of an alkali metal selected from Group 1 of the IUPAC periodic table of the elements, or any combination of such cations; with the proviso that M' does not represent the monoatomic cation of Na alone. In one embodiment, M' does not represent the monoatomic cation of Na alone.

In one embodiment, the sensor material is a synthetic material. In one embodiment, the sensor material is synthetically prepared.

The proviso that at least one of X and X' is present should in this specification, unless otherwise stated, be understood such that either X or X' is present, or such that both X and X' are present.

In this specification, unless otherwise stated, the expression "monoatomic ion" should be understood as an ion consisting of a single atom. If an ion contains more than one atom, even if these atoms are of the same element, it is to be understood as a polyatomic ion. Thus, in this specification, unless otherwise stated, the expression "monoatomic cation" should be understood as a cation consisting of a single atom.

Hackmanite, which is a variety of sodalite material, is natural mineral having the chemical formula of $Na_8Al_6Si_6O_{24}(Cl,S)_2$. A synthetic hackmanite based material showing a long emitting afterglow can be prepared. The sensor material represented by formula (I), as a result of being exposed to e.g. ultraviolet radiation or sunlight, has the technical effect of showing a long white color afterglow. In one embodiment, the wavelength of the emission of the sensor material is 370-730 nm. In one embodiment, the peak of emission of the sensor material is at about 515 nm.

In this specification, unless otherwise stated, the expressions "afterglow", "luminescence", "persistent luminescence", "phosphorescence", or any corresponding expression should be understood as referring to the phenomenon encountered in materials which make them glow in the dark after having been subjected to a heat treatment and/or to optical stimulation.

In one embodiment, M' represents a combination of at least two monoatomic cations of different alkali metals selected from Group 1 of the IUPAC periodic table of the elements.

In one embodiment, M' represents a combination of at least two monoatomic cations of different alkali metals selected from Group 1 of the IUPAC periodic table of the elements, and wherein the combination comprises at most 66 mole percent (mol-%) of the monoatomic cation of Na. In one embodiment, M' represents a combination of at least two monoatomic cations of different alkali metals selected from Group 1 of the IUPAC periodic table of the elements, and wherein the combination comprises at most 50 mol-% of the monoatomic cation of Na. In one embodiment, M' represents a combination of at least two monoatomic cations of different alkali metals selected from Group 1 of the IUPAC periodic table of the elements, and wherein the combination comprises at most 40 mol-% of the monoatomic cation of Na, or at most 30 mol-% of the monoatomic cation of Na, or at most 20 mol-% of the monoatomic cation of Na.

In one embodiment, M' represents a combination of at least two monoatomic cations of different alkali metals selected from Group 1 of the IUPAC periodic table of the elements, wherein the combination comprises 0-98 mol-% of the monoatomic cation of Na. In one embodiment, M' represents a combination of at least two monoatomic cations of different alkali metals selected from Group 1 of the IUPAC periodic table of the elements, wherein the combination comprises 0-100 mol-% of the monoatomic cation of K. In one embodiment, M' represents a combination of at least two monoatomic cations of different alkali metals selected from Group 1 of the IUPAC periodic table of the elements, wherein the combination comprises 0-100 mol-% of the monoatomic cation of Rb. In one embodiment, M' represents a combination of at least two monoatomic cations of different alkali metals selected from Group 1 of the IUPAC periodic table of the elements, wherein the combination comprises 0-100 mol-% of the monoatomic cation of Li.

In one embodiment, M' represents a combination of at least two monoatomic cations of different alkali metals selected from a group consisting of Li, Na, K, and Rb. In one embodiment, M' represents a combination of two monoatomic cations of different alkali metals selected from a group consisting of Li, Na, K, and Rb. In one embodiment, M' represents a combination of three monoatomic cations of different alkali metals selected from a group consisting of Li, Na, K, and Rb. In one embodiment, M' represents a combination of monoatomic cations of Li, Na, K, and Rb.

In one embodiment, M' represents a combination of a monoatomic cation of Na with a monoatomic cation of Li, a monoatomic cation of K and/or a monoatomic cation of Rb. In one embodiment, M' represents a combination of a monoatomic cation of Na with a monoatomic cation of K or a monoatomic cation of Rb. In one embodiment, M' represents a combination of a monoatomic cation of Na with a monoatomic cation of K and a monoatomic cation of Rb.

In one embodiment, M' represents a combination of a monoatomic cation of Na and a monoatomic cation of K; or a combination of a monoatomic cation of Na and a monoatomic cation of Rb; or a combination of a monoatomic cation of K and a monoatomic cation of Rb; or a combination of a monoatomic cation of Na, a monoatomic cation of K, and a monoatomic cation of Rb; or a combination of a monoatomic cation of K and a monoatomic cation of Rb.

In one embodiment, M' represents a combination of a monoatomic cation of Li and a monoatomic cation of Na; or a combination of a monoatomic cation of Li and a monoatomic cation of K; or a combination of a monoatomic cation of Li and a monoatomic cation of Rb; or a combination of a monoatomic cation of Li, a monoatomic cation of K, and a monoatomic cation of Rb; or a combination of a monoatomic cation of Li, a monoatomic cation of Na, a monoatomic cation of K and a monoatomic cation of Rb.

In one embodiment, M' represents a monoatomic cation of Li. In one embodiment, M' represents a monoatomic cation of K. In one embodiment, M' represents a monoatomic cation of Rb.

By controlling the combination of at least two monoatomic cations of different alkali metals selected from Group 1 of the IUPAC periodic table of the elements makes it possible to adjust the effect of the material to change color and/or to show afterglow.

In one embodiment, M" represents a trivalent monoatomic cation of a metal selected from a group consisting of Al and Ga, or a combination of such cations.

In one embodiment, M" represents a trivalent monoatomic cation of B.

In one embodiment, M" represents a trivalent monoatomic cation of an element selected from a group consisting of Cr, Mn, Fe, Co, Ni, and Zn, or any combination of such cations.

In one embodiment, M'" represents a monoatomic cation of an element selected from a group consisting of Si, Ge, Al, Ga, N, P, and As, or any combination of such cations.

In one embodiment, M'" represents a monoatomic cation of an element selected from a group consisting of Si and Ge, or a combination of such cations.

In one embodiment, M'" represents a monoatomic cation of an element selected from a group consisting of Al, Ga, N, P, and As, or any combination of such cations.

In one embodiment, M''' represents a monoatomic cation of an element selected from a group consisting of Al and Ga, or a combination of such cations.

In one embodiment, M''' represents a monoatomic cation of an element selected from a group consisting of N, P, and As, or any combination of such cations.

In one embodiment, M''' represents a monoatomic cation of Zn.

In one embodiment, X represents an anion of an element selected from a group consisting of F, Cl, Br, I, and At, or any combination of such anions. In one embodiment, X represents an anion of an element selected from a group consisting of F, Cl, Br, and I, or any combination of such anions. In one embodiment, X is absent.

In one embodiment, X' represents an anion of an element selected from a group consisting of O, S, Se, and Te, or any combination of such anions. In one embodiment, X' represents an anion of S. In one embodiment X' is absent.

In one embodiment, the material is doped with at least one transition metal ion. In one embodiment, the material is represented by formula (I), wherein M'''' represents a cation of an element selected from transition metals of the IUPAC periodic table of the elements, or any combination of such cations. In one embodiment, M'''' represents a cation of an element selected from a group consisting of Ti, V, Cr, Mn, Fe, Co, Ni, Cu, and Zn, or any combination of such cations. In one embodiment, M'''' represents a cation of Ti.

In one embodiment, the material is represented by formula (I), wherein M'''' is absent. In this embodiment the material is not doped.

In one embodiment, the material represented by the formula (I) comprises M'''' in an amount of 0.001-10 mol-%, or 0.001-5 mol-%, or 0.1-5 mol-% based on the total amount of the material.

In one embodiment, the material is selected from a group consisting of:

$(Li_xNa_{1-x-y-z}K_yRb_z)_8$ (Al, Ga)$_6$Si$_6$O$_{24}$ (Cl,S)$_2$: Ti,
$(Li_xNa_{1-x-y-z}K_yRb_z)_8$ (Al, Cr) SiCO$_{24}$ (Cl,S)$_2$: Ti
$(Li_xNa_{1-x-y-z}K_yRb_z)_8$ (Al, Mn) SiO$_{24}$ (Cl,S)$_2$: Ti,
$(Li_xNa_{1-x-y-z}K_yRb_z)_8$ (Al, Fe) SiSO$_{24}$ (Cl,S)$_2$: Ti,
$(Li_xNa_{1-x-y-z}K_yRb_z)_8$ (Al, CO) Si$_{24}$ (Cl,S)$_2$: Ti,
$(Li_xNa_{1-x-y-z}K_yRb_z)_8$ (Al,Ni)$_6$Si$_6$O$_{24}$ (Cl,S)$_2$:Ti,
$(Li_xNa_{1-x-y-z}K_yRb_z)_8$ (Al, Cu) SiSO$_{24}$ (Cl,S)$_2$: Ti,
$(Li_xNa_{1-x-y-z}K_yRb_z)_8$ (Al, B)$_6$SiSO$_{24}$ (Cl,S)$_2$: Ti,
$(Li_xNa_{1-x-y-z}K_yRb_z)_8$Mn$_6$SiSO$_{24}$ (Cl,S)$_2$:Ti,
$(Li_xNa_{1-x-y-z}K_yRb_z)_8$Cr$_6$Si SO$_{24}$ (Cl,S)$_2$:Ti,
$(Li_xNa_{1-x-y-z}K_yRb_z)_8$Fe$_6$Si$_6$O$_{24}$ (Cl,S)$_2$:Ti,
$(Li_xNa_{1-x-y-z}K_yRb_z)_8$Co$_6$Si$_6$O$_{24}$ (Cl,S)$_2$:Ti,
$(Li_xNa_{1-x-y-z}K_yRb_z)_8$Ni$_6$SiSO$_{24}$ (Cl,S)$_2$:Ti,
$(Li_xNa_{1-x-y-z}K_yRb_z)_8$Cu$_6$Si$_{24}$ (Cl,S)$_2$:Ti,
$(Li_xNa_{1-x-y-z}K_yRb_z)_8$B$_6$Si SO$_{24}$ (Cl,S)$_2$:Ti,
$(Li_xNa_{1-x-y-z}K_yRb_z)_8$Ga$_6$Si$_6$O$_{24}$ (Cl,S)$_2$:Ti,
$(Li_xNa_{1-x-y-z}K_yRb_z)_8$Al$_6$(Si, Zn)$_6$O$_{24}$ (Cl,S)$_2$: Ti,
$(Li_xNa_{1-x-y-z}K_yRb_z)_8$Al$_6$(Si, Ge)$_6$O$_{24}$ (Cl,S)$_2$: Ti,
$(Li_xNa_{1-x-y-z}K_yRb_z)_8$Al$_6$Zn$_6$SO$_{24}$ (Cl,S)$_2$:Ti,
$(Li_xNa_{1-x-y-z}K_yRb_z)_8$Al$_6$Ge$_6$SO$_{24}$ (Cl,S)$_2$:Ti,
$(Li_xNa_{1-x-y-z}K_yRb_z)_8$Al$_6$ (Ga,Si,N)$_6$O$_{24}$ (Cl,S)$_2$: Ti,
$(Li_xNa_{1-x-y-z}K_yRb_z)_8$Al$_6$(Ga,Si,As)$_6$O$_{24}$ (Cl,S)$_2$: Ti,
$(Li_xNa_{1-x-y-z}K_yRb_z)_8$Al$_6$ (Ga,N)$_6$O$_{24}$ (Cl,S)$_2$: Ti,
$(Li_xNa_{1-x-y-z}K_yRb_z)_8$Al$_6$ (Ga,As)$_6$O$_{24}$ (Cl,S)$_2$: Ti,
$(Li_xNa_{1-x-y-z}K_yRb_z)_8$ (Al, Ga)$_6$Ge$_6$O$_{24}$ (Cl,S)$_2$: Ti,
$(Li_xN_{1-x-y-z}K_yRb_z)_8$ (Al, Cr)$_6$Ge$_6$O$_{24}$ (Cl,S)$_2$: Ti,
$(Li_xN_{1-x-y-z}K_yRb_z)_8$ (Al, Mn)$_6$Ge$_6$O$_{24}$ (Cl,S)$_2$: Ti,
$(Li_xNa_{1-x-y-z}K_yRb_z)_8$ (Al, Fe)$_6$Ge$_6$O$_{24}$ (Cl,S)$_2$: Ti,
$(Li_xN_{1-x-y-z}K_yRb_z)_8$ (Al, Co)$_6$Ge$_6$O$_{24}$ (Cl,S)$_2$: Ti,
$(Li_xN_{1-x-y-z}K_yRb_z)_8$ (Al,Ni)$_6$Ge$_6$O$_{24}$ (Cl,S)$_2$:Ti,
$(Li_xN_{1-x-y-z}K_yRb_z)_8$ (Al, Cu)$_6$Ge$_6$O$_{24}$ (Cl,S)$_2$: Ti,
$(Li_xN_{1-x-y-z}K_yRb_z)_8$ (Al, B)$_6$Ge$_6$O$_{24}$ (Cl,S)$_2$: Ti,
$(Li_xNa_{1-x-y-z}K_yRb_z)_8$Mn$_6$GeO$_{24}$ (Cl,S)$_2$: Ti,
$(Li_xN_{1-x-y-z}K_yRb_z)_8$Cr$_6$Ge$_6$O$_{24}$ (Cl,S)$_2$: Ti,
$(Li_xNa_{1-x-y-z}K_yRb_z)_8$Fe$_6$Ge$_6$O$_{24}$ (Cl,S)$_2$:Ti,
$(Li_xNa_{1-x-y-z}K_yRb_z)_8$C$_6$Ge$_6$O$_{24}$ (Cl,S)$_2$:Ti,
$(Li_xNa_{1-x-y-z}K_yRb_z)_8$Ni$_6$Ge$_6$SO$_{24}$ (Cl,S)$_2$:Ti,
$(Li_xNa_{1-x-y-z}K_yRb_z)_8$Cu$_6$Ge$_6$O$_{24}$ (Cl,S)$_2$: Ti,
$(Li_xNa(Cl,S)_2$:Ti, and
$(Li_xNa_{1-x-y-z}K_yRb_z)_8$Ga$_6$Ge$_6$O$_{24}$ (Cl,S)$_2$: Ti,
wherein
$x+y+z\leq 1$, and
$x\geq 0$, $y\geq 0$, $z\geq 0$.

In one embodiment, the material is selected from a group consisting of (Li,Na)$_8$(AlSi)$_8$O$_{24}$(Cl,S)$_2$:Ti (Na, K)$_8$ (AlSi)$_6$O$_{24}$ (Cl,S)$_2$: Ti, and (Na, Rb)$_8$ (AlSi)$_6$O$_{24}$ (Cl,S)$_2$: Ti.

In one embodiment, the material is synthesized by a reaction according to Norrbo et al. (Norrbo, I.; Gluchowski, P.; Paturi, P.; Sinkkonen, J.; Lastusaari, M., Persistent Luminescence of Tenebrescent Na$_8$Al$_6$Si$_6$O$_{24}$(Cl,S)$_2$: Multifunctional Optical Markers. Inorg. Chem. 2015, 54, 7717-7724), which reference is based on Armstrong & Weller (Armstrong, J. A.; Weller, J. A. Structural Observation of Photochromism. Chem. Commun. 2006, 1094-1096) using stoichiometric amounts of Zeolite A and Na$_2$SO$_4$ as well as LiCl, NaCl, KCl and/or RbCl as the starting materials. The at least one dopant is added as an oxide, such as TiO$_2$. The material can be prepared as follows: Zeolite A is first dried at 500° C. for 1 h. The initial mixture is then heated at 850° C. in air for 48 h. The product is then freely cooled down to room temperature and ground. Finally, the product is reheated at 850° C. for 2 h under a flowing 12% H$_2$+88% N$_2$ atmosphere. The as-prepared materials are washed with water to remove any excess LiCl/NaCl/KCl/RbCl impurities. The purity can be verified with an X-ray powder diffraction measurement.

In one embodiment, the sensor material may receive light at a first wavelength and emit at least part of the thereby received energy as light at a second wavelength which is longer than the first wavelength. In one embodiment, the sensor material is configured to receive at least part of a light emitted by a lighting device and emitting at least part of the thereby received energy as light at a second wavelength which is longer than the first wavelength. In one embodiment, the emitted light is at least partially absorbed by the sensor material, and the energy thereby absorbed is at least partially emitted by the sensor material so that the spectrum of the light emitted by the luminescent sensor material differs from the spectrum of the light received by it. By the second wavelength being longer than the first wavelength is meant that the peak wavelength of the spectrum of light emitted by the luminescent material is higher than the peak wavelength of the spectrum of the light absorbed by the luminescent material.

In one embodiment, the sensor material is a white light-emitting material. In one embodiment, the sensor material is configured to be persistent for at least 50 hours, or at least 55 hours, or at least 60 hours, or at least 65 hours. The sensor material has the added utility of being able to show a long afterglow of white color. Without limiting the invention to any specific theory about why the sensor material results in the aforementioned advantage, it should be considered that the presence of a doping cation affects the material in a manner to enable it to be persistent for a long period of time.

In one embodiment, the sensor material is part of a sensor element. The luminescent sensor material, or the sensor element, can be applied e.g. in a label on a bottle. The material can also be mixed as a powder in the raw materials used for the production of a plastic bottle, a sticker, a glass and a similar product. The present application further relates to the use of the material according to one or more embodiments described in this specification in 3D printing.

In one embodiment, the method described in this specification is used in imaging, in diagnostics, drug development, product development, in testing, or in detection technology. In one embodiment, the detection device described in this specification is used in imaging, in diagnostics, drug development, product development, in testing, or detection technology. In one embodiment, the system described in this specification is used in imaging, in diagnostics, drug development, product development, in testing, or detection technology. In one embodiment, the imaging is in vivo imaging. In one embodiment, the imaging is medical imaging. In one embodiment, the diagnostics is in vivo diagnostics. In one embodiment, the testing is point-of-care testing. In one embodiment, the method, the detection device, and/or the system described in this specification can be used in diagnosing a sample received from human or animal body. In one embodiment, the sample is selected from a group consisting of body fluids and tissues. In one embodiment, the sample comprises blood, skin, tissue and/or cells.

It will be understood that the benefits and advantages described above may relate to one embodiment or may relate to several embodiments. The embodiments are not limited to those that solve any or all of the stated problems or those that have any or all of the stated benefits and advantages.

The embodiments of the invention described hereinbefore may be used in any combination with each other. Several of the embodiments may be combined together to form a further embodiment of the invention. A detecting device, a system, an use, or a method, to which the invention is related, may comprise at least one of the embodiments of the invention described hereinbefore.

The sensor material has the added utility of it being able to be used in a large range of applications where it is beneficial to be able to determine the amount of radiation to which the sensor material has been exposed to. The sensor material has the added utility of being a low-cost and reusable material. The material has the added utility of being environmentally friendly as it does not contain any rare earth elements or other heavy metal elements.

The method, the detecting device, and the system of the present application have the added utility of enabling an efficient manner to determine the amount or dose of a predetermined type of radiation, such as e.g. ultraviolet radiation present in e.g. sunlight, to which an object has been exposed to.

EXAMPLES

Reference will now be made in detail to the described embodiments, examples of which are illustrated in the accompanying drawings.

The description below discloses some embodiments in such a detail that a person skilled in the art is able to utilize the detecting device and the method based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

Figure 1:
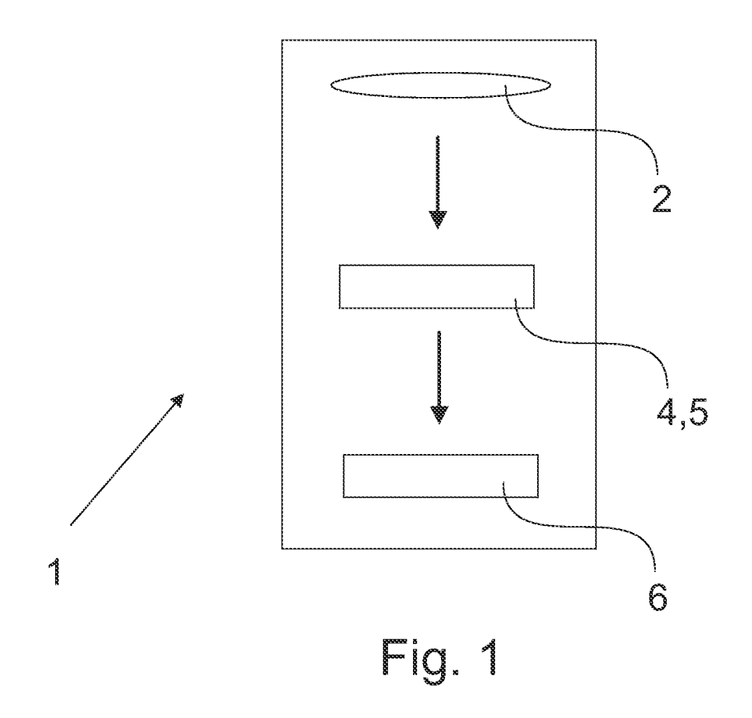
FIG. 1 schematically illustrates one embodiment of the detecting device.

FIG. 1 illustrates schematically one embodiment of the detecting device 1 for determining the amount of a predetermined type of radiation irradiated on a sensor material. The detecting device 1 as illustrated in FIG. 1 comprises a sensor material 2 as described in the this specification. The sensor material 2 is able to retain exposed radiation. The detecting device 1 as illustrated in FIG. 1 further comprises a heating unit 4 and/or a stimulation unit 5. The heating unit is configured to subject the sensor material exposed to the predetermined type of radiation, to a heat treatment. The stimulation unit is configured to subject the sensor material exposed to the predetermined type of radiation to optical stimulation. By the use of heat and/or optical stimulation one is able to cause the sensor material to emit visible light. The amount of visible light emitted by the sensor material can then be measured by a measuring unit 6, which configured to measure the amount of visible light emitted by the sensor material. The amount of visible light emitted by the sensor material as a result of being subjected to the heat treatment and/or to the optical stimulation corresponds or correlates to the amount of the predetermined type of radiation to which the sensor material has been exposed to.

Figure 2:
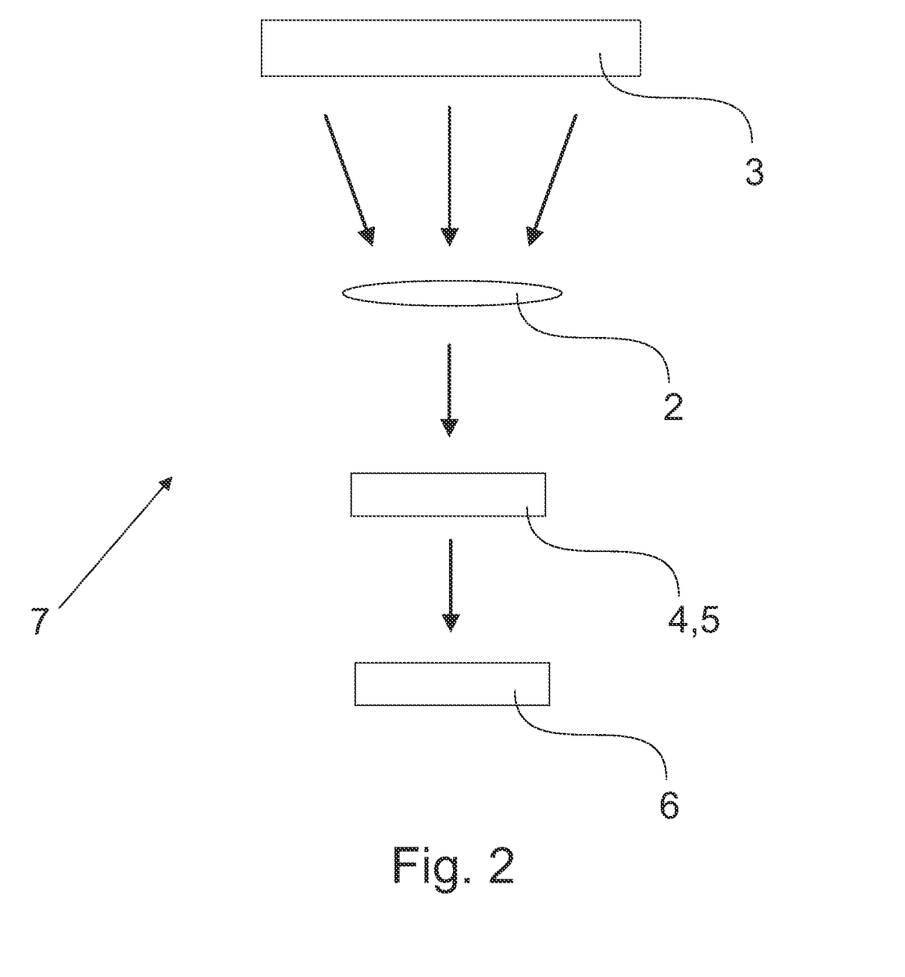
FIG. 2 schematically illustrates one embodiment of the system.

FIG. 2 illustrates schematically one embodiment of the system 7 for determining the amount of a predetermined type of radiation irradiated on a sensor material. The system 7 as illustrated in FIG. 2 comprises a radiation unit 3, which is configured to expose a sensor material 2 as described in the this specification to a predetermined type of radiation. The bolded arrows in FIG. 2 are to indicate the radiation irradiated by the radiation unit 3 on the sensor material 2. The sensor material 2 is able to retain the exposed radiation, whereby the sensor material may, if needed, be transferred from the place of irradiance to another place for analyzing. However, the sensor material may equally well be analyzed at the place of irradiance. The system as illustrated in FIG. 2 further comprises a heating unit 4 and/or a stimulation unit 5. The heating unit is configured to subject the sensor material exposed to the predetermined type of radiation, to a heat treatment. The stimulation unit is configured to subject the sensor material exposed to the predetermined type of radiation to optical stimulation. By the use of heat and/or optical stimulation one is able to cause the sensor material to emit visible light. The amount of visible light emitted by the sensor material can then be measured by a measuring unit 6, which is configured to measure the amount of visible light emitted by the sensor material. The amount of visible light emitted by the sensor material as a result of being subjected to the heat treatment and/or to the optical stimulation corresponds or correlates to the amount of the predetermined type of radiation to which the sensor material has been exposed to.

In the below examples, it is presented how the material represented by formula (I) may be prepared.

Example 1—Preparing $(Li, Na)_8Al_6Si_6O_{24} (Cl,S)_2$: Ti

The material represented by the formula $(Li,Na)_8Al_6Si_6O_{24}(Cl,S)_2$:Ti was prepared in the following manner: 0.7000 g of dried (500° C. for 1 h) Zeolite A, 0.0600 g of $Na_2SO_4$ and 0.1700 g of LiCl powders were mixed together with 0.006 g of $TiO_2$ powder. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 2—Preparing $(Na, K)_8Al_6Si_6O_{24} (Cl,S)_2$: Ti

The material represented by the formula $(Na, K)_8Al_6Si_6O_{24} (Cl,S)_2$: Ti was prepared in the following manner: 0.7000 g of dried (500° C. for 1 h) Zeolite A, 0.0600 g of Na$_2$SO$_4$ and 0.1800 g of NaCl and 0.0675 g KCl powders were mixed together with 0.006 g of TiO$_2$ powder. The mixture was heated at 850° C. in air for 48 h. The product was freely cooled down to room temperature and ground. Finally, the product was re-heated at 850° C. for 2 h under a flowing 12% H$_2$+88% N$_2$ atmosphere.

Example 3—Preparing (Na, Rb)$_8$Al$_6$Si$_6$O$_{24}$ (Cl,S)$_2$: Ti

The material represented by the formula (Na, Rb)$_8$Al$_6$Si$_6$O$_{24}$ (Cl,S)$_2$: Ti was prepared in the following manner: 0.7000 g of dried (500° C. for 1 h) Zeolite A, 0.0600 g of Na$_2$SO$_4$ and 0.4957 g of RbCl powders were mixed together with 0.006 g of TiO$_2$ powder. The mixture was heated at 850° C. in air for 48 h. The product was freely cooled down to room temperature and ground. Finally, the product was re-heated at 850° C. for 2 h under a flowing 12% H$_2$+88% N$_2$ atmosphere.

Example 4—Testing of a Sample of (Na, K)$_8$Al$_6$Si$_6$O$_{24}$ (Cl,S)$_2$

Firstly, a material represented by the formula (Na,K)Al$_6$Si$_6$O$_{24}$(Cl,S)$_2$ was prepared in the following manner: 0.7000 g of dried (500° C. for 1 h) Zeolite A, 0.0600 g of Na$_2$SO$_4$ and 0.1800 g of NaCl and 0.0675 g KCl powders were mixed. The mixture was heated at 850° C. in air for 48 h. The product was freely cooled down to room temperature and ground. Finally, the product was re-heated at 850° C. for 2 h under a flowing 12% H$_2$+88% N$_2$ atmosphere.

Samples of the prepared sensor material were then tested. Firstly, samples of the prepared material were irradiated for 10 seconds using a 4 W hand-held 254 nm UV lamp (UVP UVGL-25). Each sample was irradiated with different irradiances (0-2.0 mW/cm$^2$). Three days after being irradiated, the samples were heated by increasing the temperature thereof from 0 to 400° C. at a rate of 10° C./s. Their thermoluminescence glow abilities were measured using a MikroLab Thermoluminescent Materials Laboratory Reader RA'04. The results are shown in FIG. 3, where the thermoluminescence glow curves as well as the total thermoluminescence intensities are presented for different irradiances.

Figure 3:
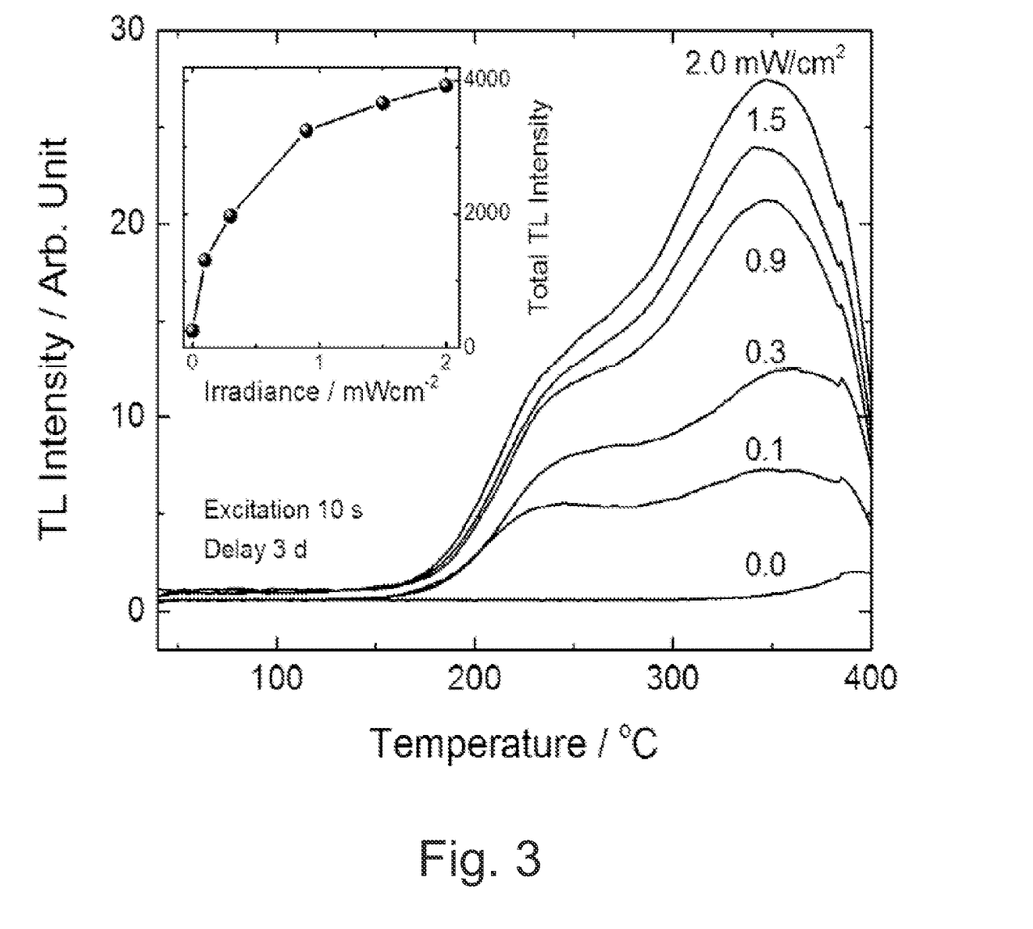
FIG. 3 and FIG. 4 disclose the test results of example 4.

Thus, the results that are presented in FIG. 3 indicate that the prepared material is able to retain radiation irradiated thereon such that the amount of radiation can be afterwards determined based on the ability of the sensor material to emit visible light when subjected to a heat treatment.

Figure 4:
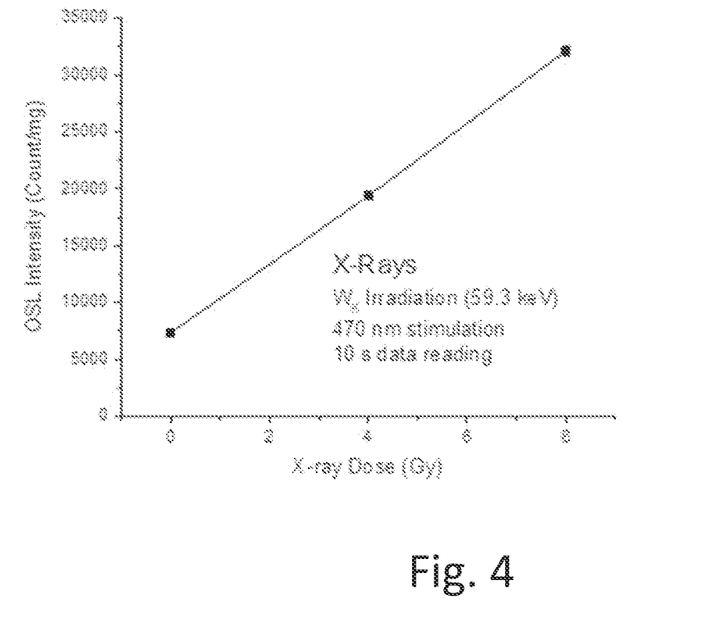

In addition a sample of the prepared material was exposed to doses of WK X-rays (59.3 keV). The material was thereafter stored overnight in a dark container. The optically stimulated luminescence (OSL) reading was carried out thereafter using a 470 nm stimulation and 10 s data reading time. The results are shown in FIG. 4.

Example 5—Testing of a Sample of (Na, Rb)$_8$Al$_6$Si$_6$O$_{24}$ (Cl,S)$_2$

The material represented by the formula (Na, Rb)$_8$Al$_6$Si$_6$O$_{24}$ (Cl,S)$_2$ was prepared in the following manner: 0.7000 g of dried (500° C. for 1 h) Zeolite A, 0.0600 g of Na$_2$SO$_4$ and 0.4957 g of RbCl powders were mixed. The mixture was heated at 850° C. in air for 48 h. The product was freely cooled down to room temperature and ground. Finally, the product was re-heated at 850° C. for 2 h under a flowing 12% H$_2$+88% N$_2$ atmosphere.

Figure 5:
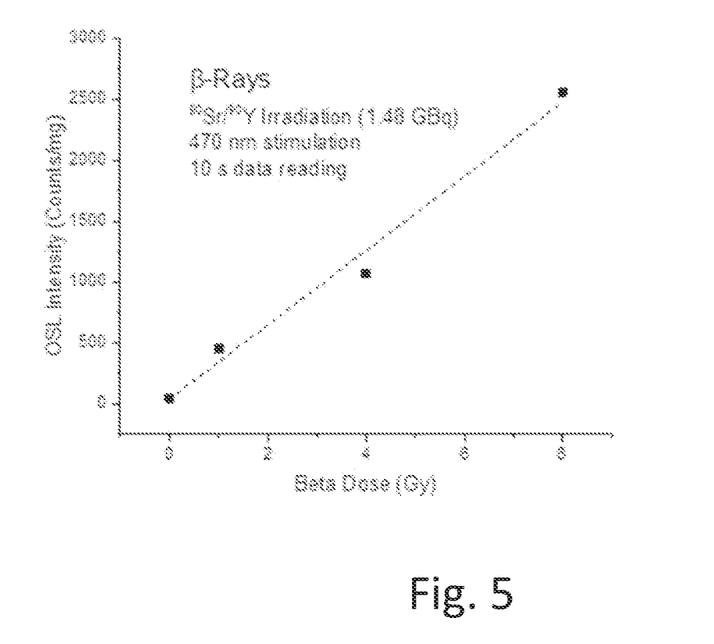
FIG. 5 discloses the test results of example 5.

A sample of the prepared sensor material was then tested. A sample of the prepared material was exposed to doses of $^{90}$Sr/$^{90}$Y β-radiation (1.48 GBq). The material was thereafter stored overnight in a dark container. The optically stimulated luminescence (OSL) reading was carried out thereafter using a 470 nm stimulation and 10 s data reading time. The results are shown in FIG. 5.

Example 6—Testing of a Sample of Na$_8$Al$_6$Si$_6$O$_{24}$ (Cl,S)$_2$

The material represented by the formula Na$_8$Al$_6$Si$_6$O$_{24}$ (Cl,S)$_2$ was prepared in the following manner: 0.7000 g of dried (500° C. for 1 h) Zeolite A and 0.0600 g of Na$_2$SO$_4$ were mixed. The mixture was heated at 850° C. in air for 48 h. The product was freely cooled down to room temperature and ground. Finally, the product was re-heated at 850° C. for 2 h under a flowing 12% H$_2$+88% N$_2$ atmosphere.

Figure 6:
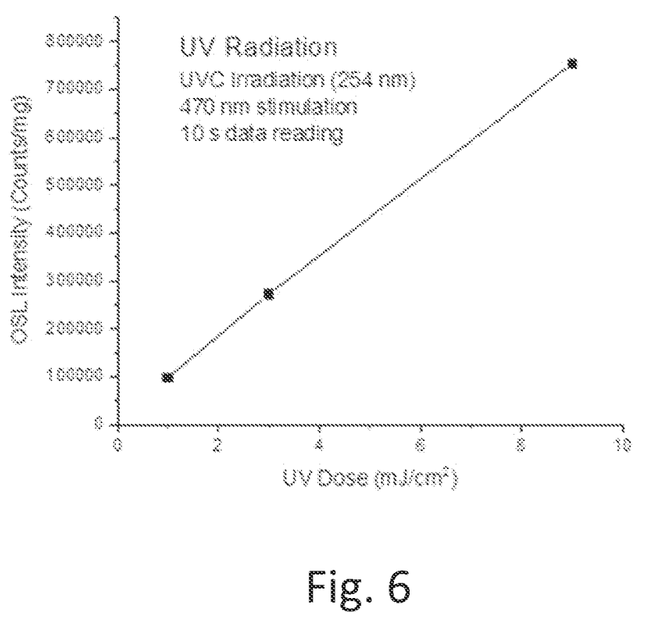
FIG. 6 discloses the test results of example 6.

A sample of the prepared sensor material was then tested. A sample of the prepared material was exposed to doses UVC-radiation (254 nm). The material was thereafter stored overnight in a dark container. The optically stimulated luminescence (OSL) reading was carried out thereafter using a 470 nm stimulation and 10 s data reading time. The results are shown in FIG. 6.

It is to be noted that the embodiments of the claims are not limited to those discussed above, but further embodiments may exist within the scope of the claims.

The invention claimed is:

1. A method for determining an amount of a predetermined type of radiation irradiated on a sensor material, wherein the method comprises:
   a) providing a sensor material;
   b) exposing the sensor material to the predetermined type of radiation for retaining the predetermined type of radiation in the sensor material for a predetermined period of time;
   c) subjecting the sensor material, which has been exposed to the predetermined type of radiation, to heat treatment and/or to optical stimulation; and
   d) determining an amount of visible light emitted by the sensor material as a result of being subjected to the heat treatment and/or to the optical stimulation;
   wherein the sensor material is represented by the following formula (I)

(M')$_8$(M''M''')$_6$O$_{24}$(X,X')$_2$:M''''      formula (I)

wherein
   M' represents a monoatomic cation of an alkali metal selected from Group 1 of the IUPAC periodic table of the elements, or any combination of such cations;
   M'' represents a trivalent monoatomic cation of an element selected from Group 13 of the IUPAC periodic table of the elements, or of a transition element selected from any of Groups 3-12 of the IUPAC periodic table of the elements, or any combination of such cations;
   M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;
   X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or any combination of such cations, or wherein M'''' is absent;

with the proviso that at least one of X and X' is present.

2. The method of claim 1, wherein the predetermined type of radiation is electromagnetic radiation having a wavelength of above 0 nm to 590 nm.

3. The method of claim 1, wherein the heat treatment comprises increasing the temperature of the sensor material.

4. The method of claim 1, wherein the optical stimulation of the sensor material comprises subjecting the sensor material to electromagnetic radiation having a wavelength of 310-1400 nm.

5. The method of claim 1, wherein the method comprises e) comparing the determined amount of light emitted by the sensor material with a reference indicating the correlation of the amount of emitted visible light with the amount of the predetermined type of radiation that the sensor material has been exposed to.

6. The method of claim 1, wherein M' represents a monoatomic cation of an alkali metal selected from Group 1 of the IUPAC periodic table of the elements, or any combination of such cations, with the proviso that M' does not represent the monoatomic cation of Na alone.

7. The method of claim 1, wherein M' represents a combination of at least two monoatomic cations of different alkali metals selected from Group 1 of the IUPAC periodic table of the elements.

8. The method of claim 1, wherein M' represents a combination of at least two monoatomic cations of different alkali metals selected from a group consisting of Li, Na, K, and Rb.

9. The method of claim 1, wherein M' represents a monoatomic cation of an alkali metal selected from a group consisting of Li, K, and Rb, or any combination of such cations.

10. The method of claim 1, wherein M' represents a combination of a monoatomic cation of Na with a monoatomic cation of Li, a monoatomic cation of K and/or a monoatomic cation of Rb.

11. The method of claim 1, wherein M'' represents a trivalent monoatomic cation of a metal selected from a group consisting of Al and Ga, or a combination of such cations.

12. The method of claim 1, wherein M'' represents a trivalent monoatomic cation of B.

13. The method of claim 1, wherein M''' represents a monoatomic cation of an element selected from a group consisting of Si and Ge, or a combination of such cations.

14. The method of claim 1, wherein M''' represents a monoatomic cation of an element selected from a group consisting of Al, Ga, N, P, and As, or any combination of such cations.

15. The method of claim 1, wherein X represents an anion of an element selected from a group consisting of F, Cl, Br, and I, or any combination of such anions.

16. The method of claim 1, wherein X' represents an anion of an element selected from a group consisting of O, S, Se, and Te, or any combination of such anions.

17. The method of claim 1, wherein M'''' represents a cation of an element selected from a group consisting of Ti, V, Cr, Mn, Fe, Co, Ni, Cu, and Zn, or any combination of such cations.

18. A detecting device for determining an amount of a predetermined type of radiation irradiated on a sensor material, wherein the detecting device comprises:

a sensor material represented by the following formula (I)

$$(M')_8(M''M''')_6O_{24}(X,X')_2:M''''$$ formula (I)

wherein

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;

X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or any combination of such cations, or wherein M'''' is absent;

with the proviso that at least one of X and X' is present;

a heating unit configured to subject the sensor material, having been exposed to the predetermined type of radiation, to a heat treatment, and/or a stimulation unit configured to subject the sensor material, having been exposed to the predetermined type of radiation, to optical stimulation; and a measuring unit configured to measure the amount of light emitted by the sensor material as a result of being subjected to the heat treatment and/or to the optical stimulation.

19. The detecting device of claim 18, wherein the heating unit is configured to increase the temperature of the sensor material.

20. The detecting device of claim 18, wherein the stimulation unit is configured to subject the sensor material to electromagnetic radiation having a wavelength of 310-1400 nm.

21. The detecting device of claim 18, wherein the stimulation unit is a laser, a light emitting diode (LED), an organic light-emitting diode (OLED), an active-matrix organic light emitting diode (AMOLED), an incandescent lamp, a halogen lamp, or any combination thereof.

22. A system for determining the amount of a predetermined type of radiation irradiated on a sensor material, wherein the system comprises:

a radiation unit configured to expose the sensor material to the predetermined type of radiation for retaining the predetermined type of radiation in the sensor material for a predetermined period of time; and a detecting device as defined in claim 18.

23. The system of claim 22, wherein the radiation unit is configured to expose the sensor material to electromagnetic radiation having a wavelength of above 0 nm to 590 nm.

24. The system of claim 22, wherein the system comprises a reference configured to indicate the correlation of the determined amount of light emitted by the sensor material with the amount of the predetermined type of radiation that the sensor material has been exposed to.

25. A method for determining an amount of a predetermined type of radiation irradiated on a sensor material, wherein the method comprises:
  a) exposing the sensor material to the predetermined type of radiation for retaining the predetermined type of radiation in the sensor material for a predetermined period of time; and
  b) subjecting the sensor material, which has been exposed to the predetermined type of radiation, to heat treatment and/or to optical stimulation;
  wherein the sensor material is represented by the following formula (I)

$$(M')_8(M''M''')_6O_{24}(X,X')_2:M''''  \qquad \text{formula (I)}$$

wherein
  M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or of an element selected from any of Groups 13 and 15 of the IUPAC periodic table of the elements, or of Zn, or any combination of such cations;

X represents an anion of an element selected from Group 17 of the IUPAC periodic table of the elements, or any combination of such anions, or wherein X is absent;

X' represents an anion of an element selected from Group 16 of the IUPAC periodic table of the elements, or any combination of such anions, or wherein X' is absent; and M'''' represents a dopant cation of an element selected from transition metals of the IUPAC periodic table of the elements, or any combination of such cations, or wherein M'''' is absent;

with the proviso that at least one of X and X' is present.

* * * * *